Patented Sept. 5, 1950

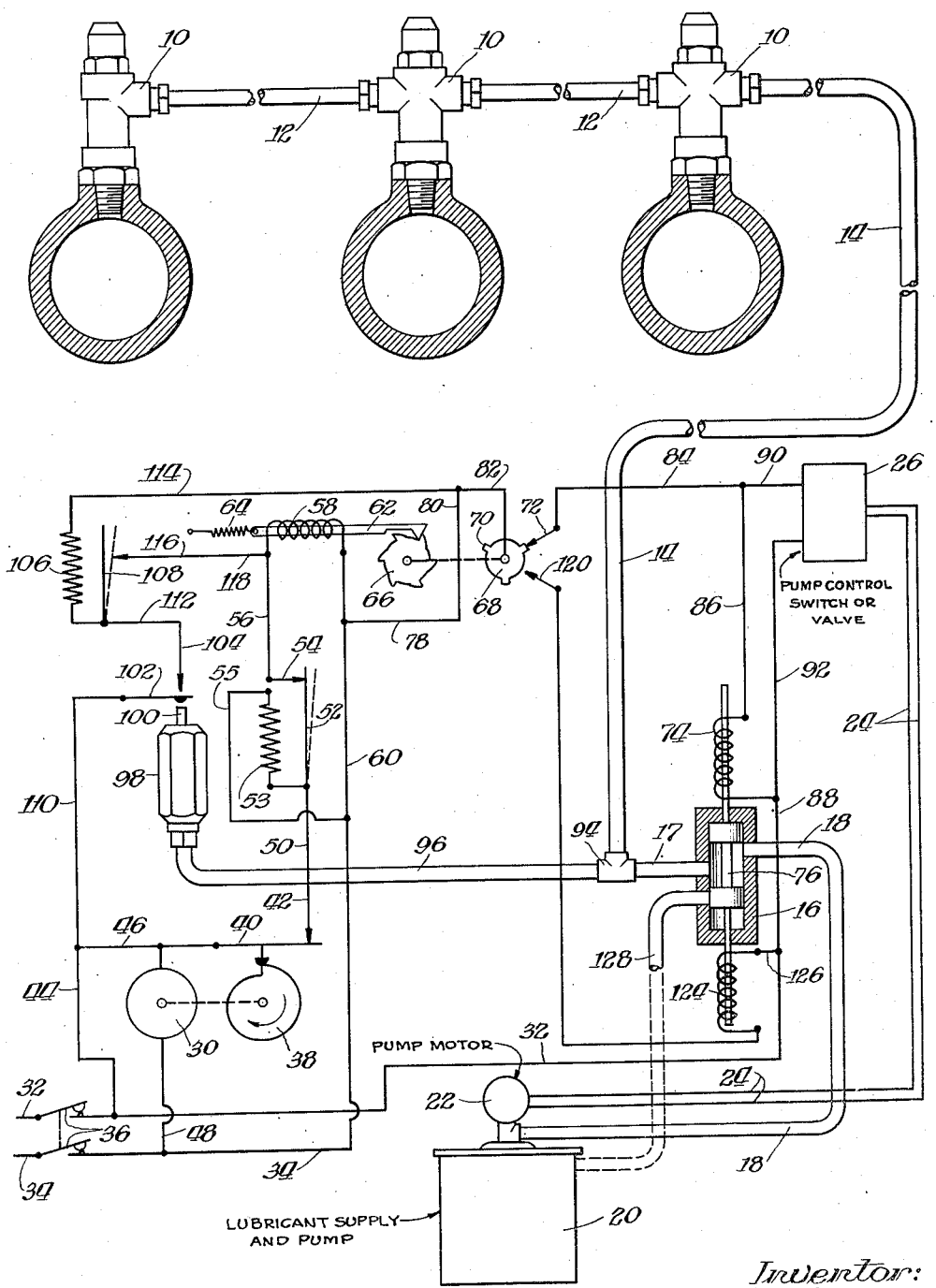

2,521,615

UNITED STATES PATENT OFFICE 2,521,615

LUBRICATING APPARATUS

Jerome F. Walker, Victor, N. Y., assignor to Stewart-Warner Corporation, Chicago, Ill., a corporation of Virginia Application March 27, 1947, Serial No. 737,560

9 Claims. (Cl. 184—7)

This invention relates to lubricating apparatus of the type which includes a series of measuring valves by which lubricant is delivered to serve the bearings of a machine or several machines or other apparatus and in which all the measuring valves are periodically actuated under control of a timing device.

One object of the invention is to provide a new and improved control mechanism for a centralized lubricating system.

Another object of the invention is to provide a new improved control mechanism and timing apparatus for a centralized lubricating system including relatively simple and inexpensive operating elements arranged for regular and reliable actuation of the lubricant distributing means.

More specifically it is an object of the invention to provide a control mechanism for an automatic lubricating system of the single line type in which the several measuring valves are connected in a series and are supplied with lubricant from one end of the series until the pressure in the system builds up to a value sufficient to actuate means for shutting off the supply; and the present invention includes an electrically driven clock or timer and electrically actuated control means for the lubricating system and the pump thereof so arranged that the clock or timer initiates operation of the pump at predetermined intervals while the pressure in the supply line terminates such operation automatically when distribution of the lubricant has been effected throughout the system.

It is therefore an additional object of the invention to provide a relatively simple control circuit for actuation of the electrical control means included in the system.

Other objects and advantages of the invention will appear from the following description taken in connection with the drawing which is a diagrammatic representation of the various elements constituting the timing and control mechanism together with representative measuring valves of the distributing system arranged in operative relation to the control mechanism.

As indicated in the drawing, a single line distributing system usually consists of a plurality of measuring valves each associated with a bearing or other part requiring lubrication. Three such valves, each designated by the numeral 10, are shown connected by sections of conduit 12 and having a feed pipe 14 which extends from a control valve 16. Said control valve is of the solenoid actuated type and is interposed between the feed pipe 14 and a supply pipe 18 leading from a lubricant supply 20 which may be understood as including a suitable pump suspended within the lubricant tank or reservoir which is indicated diagrammatically at 20 in the drawing. 22 represents a driving motor for the lubricant pump. Said motor may be operated either by compressed air or by electric current. The feed line 24 extending to the motor 22 may therefore represent either a compressed air pipe or an electrical conductor or pair of conductors, as may be required. The connection of the motor 22 with a source of power such as a supply of compressed air or an electric current for driving the motor, is effected by any suitable mechanism indicated at 26 and operated electromagnetically at intervals by the timing and control mechanism about to be described.

For timing the apparatus so as to deliver metered quantities of lubricant to the several bearing at regular intervals, there is provided a synchronous motor 30 which may be similar to that employed to drive an electric clock and which is therefore referred to hereinafter as the "clock" of the system. The clock is driven by alternating current derived from supply wires 32 and 34 whenever the main switch 36 is closed, and said clock then runs continuously to drive a rotatable cam 38. When the lobe or high point of the cam 38 engages the switch arm 40, it swings said arm against the contact 42. This establishes a circuit from the supply wire 32 and switch 36 through conductor 44, conductor 46, switch 40 and conductor 50 to the switch arm 52 of a normally closed thermal switch. The contact point 54 of said switch is connected by conductor 56 to the magnet coil 58 of a ratchet relay, and a return wire extends to the supply wire 34 to complete the circuit. The return wire is shown at 60.

The ratchet relay as shown diagrammatically in the drawing includes an armature 62 normally retracted by a spring 64. When the coil 58 is energized, said armature is projected as shown in the drawing to turn the ratchet wheel 66 through a limited angle, thus driving the contact disk 68 through a corresponding angle so as to bring one of its lobes 70 into engagement with the contact point 72 as shown in the drawing. This establishes a circuit for the solenoid-operated valve 16 so as to energize its solenoid coil 74 and shift the valve member 76 to the position shown in which it provides communication between the supply pipe 18 and the feed pipe 14 of the lubricant distributing system. The circuit for thus energizing the solenoid 74 may be traced from the supply wire 34 and switch 36 through conductor 60, conductors 78, 80 and 82, contact disk 68, contact point 72, conductor 84 and conductor 86 connecting with the coil 74. From said coil the conductor 88 leads directly to the feed wire 32 and completes the circuit.

At the same time an actuating circuit is established for the control device 26 which starts the pump motor 22; a conductor 90 extends from the conductor 84 to the control device 26, and a return wire 92 extends therefrom to the conductor 88 so that the electrical control device 26 is coupled in parallel with the solenoid coil 74 and is actuated simultaneously therewith either to open a suitable compressed air supply valve for operating a compressed air motor at 22 or to close a suitable switch for supplying electric current to an electric motor at 22 to drive the pump.

When the switch 40 is closed by the cam 38 it not only furnishes current to the relay coil 58 but also supplies current to the heating coil 53 of the thermal switch 52, a return wire 55 leading from said coil to the conductor 60 and thence to the current supply wire 34 to complete the heating circuit. Therefore, after a brief interval the switch arm 52 is deflected by the increase in temperature and separates from the contact 54 thus opening the relay circuit through coil 58 and permitting the spring 64 to retract the armature 62 ready for another driving stroke. The ratchet wheel 66 and contact disk 68, however, remain fixed so as to maintain the circuits for the solenoid 74 and motor control 26, and the pump will continue to operate until the lubricating system has completed the delivery of a charge of lubricant to each bearing served thereby. When the lubricant under pressure has reached the last measuring valve 10 of the series, such as the valve indicated in the upper left hand portion of the drawing, each of the measuring valves 10 will have discharged its metered supply of lubricant to its bearing and will then block further discharge of lubricant, thus causing the supply pressure to build up in the line 14. By means of a T-fitting 94, the outlet port 17 of the valve 16 is connected to the feed pipe 14 and also to a pipe 96 leading to a pressure actuated device 98 having a plunger 100 which is protruded when a predetermined pressure is applied thereto. This occurs when all the measuring valves 10 of the system have been actuated and the line is filled with lubricant under pressure. The protrusion of the plunger 100 swings the switch arm 102 into engagement with the contact 104 to energize the heating coil 106 of a normally open thermal switch 108. The circuit for the heating coil 106 extends from the supply wire 32 and switch 36 through conductor 44 and conductor 110 extending therefrom to the switch 102, thence through the contact 104 and conductor 112 through the coil 106 and conductors 114, 80, 78, 60, and feed wire 34. After a brief interval the heating coil 106 will cause the switch arm 108 to deflect into engagement with the contact 116 from which conductor 118 extends to the relay coil 58. The relay is thus energized and its armature 62 is projected to rotate the ratchet wheel 66 through another step, shifting the lobe 70 of the disk 68 from its engagement with contact 72 into engagement with contact 120. From this point a conductor 122 extends to the solenoid coil 124 while conductor 126 connects the coil with conductor 88 and feed wire 32. The solenoid 124 is thus energized to shift the valve member 76 so as to cut off connection between the supply pipe 18 and the outlet 17, venting the valve through pipe 128 which may lead back to the lubricant reservoir at 20 as indicated in dotted outline. At the same time the interruption of the connection between the contact disk 68 and contact point 72 breaks the circuit through the pump control device 26, and stops the pump motor 22.

The shifting of the valve 76 relieves the pressure in the lubricating system and in the line 96, thus permitting the plunger 100 to withdraw from its protruded position and causing the switch 102 to open. This breaks the circuit for the heater coil 106 so that after a brief lapse of time the switch arm 108 returns to its original position out of engagement with the contact 116, thus deenergizing the relay coil 58 and permitting the spring 64 to retract the armature 62 ready for a new driving stroke.

The lobe of the timing cam 38 which initiated operation of the system by closing the switch 40 will have moved out of engagement with the switch arm and permitted the switch to open during the operation of the system, so that when the valve 76 is reversed and the pump motor 22 is stopped through the agency of the pressure-operated switch 102 the valve 76 will remain in closed position and the pump motor 22 will not be started again until the timing cam 38 has again closed the switch 40. It may be understood, of course, that the cam 38 may have more than one operating lobe so as to actuate the switch 40 more than once for each rotation of the cam disk 38 or that said cam may be connected to the clock or driving motor 30 by a suitable gearing to insure actuation of the lubricating system at any desired regular intervals. Since the circuit for the clock 30 is established from feed wire 32, through switch 36, conductors 44, 46, 48 and feed wire 34, the clock will run continuously until the switch 36 is opened.

If preferred, the solenoid 124 for the valve 76 may be omitted and a spring may be substituted for closing the valve when the solenoid 74 is deenergized by the shifting of a contact lobe of the disk 68 out of engagement with the contact 72. Contact 120 would then be omitted, together with conductors 122 and 126, but the apparatus would be otherwise unchanged.

While there are shown and described herein certain devices presented in combination as embodying and illustrating the invention, it is to be understood that the invention is not limited thereto or thereby, but includes all modifications, variations and equivalents which may come within the scope of the appended claims.

I claim:

1. In combination with a lubricant distributing system, a source of electrical energy, a clock continuously driven thereby, a timing cam driven by said clock, a pump and a supply of lubricant in communication with said pump, valve means controlling communication between said pump and the system, solenoid means to actuate said valve means, a relay switch connected to energize said solenoid means for alternately opening and closing said valve means, a circuit for connecting said relay with the energy source and including a switch actuated by said timing cam to energize the relay, together with a normally closed thermal switch in said circuit adapted to open the circuit after the relay has been actuated and the valve means has been opened by said solenoid means, and a second circuit for connecting said relay with said energy source and including a normally open thermal switch and a pressure switch operable to energize the thermal switch in response to a predetermined lubricant pressure in the system for closing the same and thereby closing said second relay circuit and actuating the solenoid means to close said valve means.

2. In combination with a lubricant distributing system, a source of electrical energy, a clock continuously driven thereby, a timing cam driven by said clock, an electrically controlled pump and a supply of lubricant in communication with said pump, valve means controlling communication between said pump and the system, two solenoid means to actuate said valve means, a relay switch connected to energize said solenoid means alternately for opening and closing said valve means, a circuit for connecting said relay with the energy source and including a switch actuated by said timing cam to energize the relay, a normally closed thermal switch in said circuit adapted to open the circuit after the relay has been actuated and the valve means has been opened by said solenoid means, electrically actuated control means for the pump connected in parallel with the solenoid means for opening the valve means and adapted to keep the pump operating only while the current is closed through said solenoid means and said control means, and other means including means energized in response to an increase in pressure in the system to energize said relay and operate said switch in a direction to stop said pump and effect closing of said valve means and venting of the system and pressure responsive means, said other means thereupon returning to inoperative position.

3. In combination with a single line lubricant distributing system, a source of electrical energy, a clock continuously driven thereby, a timing cam driven by said clock, a pump and a supply of lubricant in communication with said pump, valve means controlling communication between the pump and the system, intermittently operable electro-magnetic means which moves said valve means alternately into position for connecting the system with the pump and into position for closing said connection and venting the system, a circuit for connecting said electromagnetic means with said energy source, a switch actuated by the timing cam to energize said electro-magnetic means for moving the valve means into its open position connecting the system with the pump, together with means to automatically open the circuit after said valve means has been so moved to its open position, a second circuit for energizing said electromagnetic means to move said valve to close communication with the system and vent the same, a thermal switch to close said second circuit, and means responsive to an increase in pressure in the system to energize said thermal switch.

4. In combination with a lubricant distributing system, a source of lubricant under pressure including a pump, electro-magnetically controlled valve means operable to open communication between the system and pump and to close communication from the pump and vent the system, control circuits for said pump and said valve means which when energized open said valve means and start said pump, electrically operated circuit controller means operable alternately to close and open said control circuits, a first circuit for energizing said controller to close said control circuits, means for opening and closing said first circuit including a timer for closing the same periodically and means for opening the circuit after initial closure by said timer, a second circuit for energizing said circuit controller to open said control circuits and stop said pump and vent the system, and means for closing said second circuit including means responsive to an increase in the pressure in said system.

5. In combination with a lubricant distributing system, a source of lubricant under pressure including a pump, electro-magnetically controlled valve means to open communication between the system and pump and to close communication between the pump and system and vent the same, a control circuit for said pump, control circuits for said valve means including a circuit which opens said valve means when energized and a circuit for closing the valve means and venting the system, electrically operated circuit controller means operable successively between a first position for closing said pump circuit and said valve opening circuit, and a second position to open valve opening circuit and pump circuit and close said valve closing circuit, a first circuit for energizing said controller to move the same to said first position, means for opening and closing said first circuit including a timer for closing the same periodically, and means for opening said circuit after initial closure thereof by said timer, a second circuit for energizing said controller to move the same to said second position and thereby stop said pump and vent the system, and means for closing said second circuit including means responsive to an increase in the pressure in said system and thermo-responsive means energized upon actuation of said pressure responsive means.

6. In combination with a lubricant distributing system, a source of lubricant under pressure, electro-magnetically controlled valve means to open communication between the system and the source of supply of lubricant and to close communication to the system and vent the same, a control circuit for said valve means which opens the same when energized, a relay switch for controlling energization of said control circuit, a first relay circuit which when energized is adapted to move said switch in a direction to energize said control circuit from said source of current, means controlling opening and closing of said first relay circuit including a timer for closing the circuit and thermo-responsive means for opening the first relay circuit after closure by said timer, and a second relay circuit which when energized moves said relay switch to de-energize said control circuit and effect closure of said valve means.

7. In combination with a lubricant distributing system, a source of lubricant under pressure, electro-magnetically controlled valve means to open communication between the system and the source of supply of lubricant and to close communication to the system and vent the same, a control circuit for said valve means which opens the same when energized, a relay switch for controlling energization of said control circuit, a first relay circuit which when energized is adapted to move said switch in a direction to energize said control circuit from said source of current, means controlling opening and closing of said first relay circuit, and a second relay circuit including a switch responsive to an increase in the pressure of the lubricant in said system and a thermo-responsive switch in a circuit closed by said pressure responsive switch and adapted when closed to energize said relay switch and thereby deenergize said control circuit and effect closure of the valve means.

8. In combination with a lubricant distributing system, a source of lubricant under pressure, electro-magnetically controlled valve means to open communication between the system and the source of supply of lubricant and to close communication to the system and vent the same, a control circuit for said valve means which when energized opens the same, a relay switch for controlling energization of said control circuit, a first relay circuit which when energized is adapted to move said switch in a direction to energize said control circuit from said source of current, means controlling opening and closing of said first relay circuit including a timer for closing the circuit and thermo-responsive means for opening the first relay circuit after initial closure by the timer, and a second relay circuit including a switch responsive to the pressure of the lubricant in said system and a thermo-responsive switch in a circuit closed by said pressure responsive switch and adapted when closed to energize said relay switch and thereby deenergize said control circuit to effect closing of said valve.

9. In combination with a lubricant distributing system, a source of lubricant under pressure including a pump, an electro-magnetically controlled valve to open communication between the system and the source of supply of lubricant and to close communication to the system and vent the same, control circuits for said pump and said valve which when energized open said valve and start said pump, a first relay circuit which when energized is adapted to cause energization of said control circuits, means for closing and opening said first relay circuit including a timer for closing said circuit periodically, and a thermo-responsive means energized following initial closing of the first relay circuit by the timer to open the same, a second relay circuit which when energized is adapted to cause deenergization of said control circuits to stop said pump and to vent the system, and means for closing said second circuit including a device responsive to the pressure in said system and a thermo-responsive device energized through said pressure responsive device.

JEROME F. WALKER.

REFERENCES CITED

The following references are of record in the file of this patent:

UNITED STATES PATENTS

| Number | Name | Date |
|---|---|---|
| 2,339,532 | Venable | Jan. 18, 1944 |